Patented Apr. 5, 1949

2,466,393

UNITED STATES PATENT OFFICE 2,466,393

PREPARATION OF ESTERS OF ACIDS OF PHOSPHORUS

Joseph B. Dickey, Rochester, N. Y., and James G. McNally, Oak Ridge, Tenn., assignors to Eastman Kodak Company, Rochester, N. Y., a corporation of New Jersey No Drawing. Application June 29, 1945, Serial No. 602,412

3 Claims. (Cl. 260—403)

This invention relates to the preparation of hitherto unknown esters of the acids of phosphorus and more particularly to the preparation of phosphated and phosphited compounds derived from unsaturated esters.

This invention has for its object to provide a process for producing certain new chemical compounds which are esters of the acids of phosphorus. A further object is to provide new phosphated and phosphited compounds which are derived from blown esters of unsaturated carboxylic acids. A still further object is to provide improved phosphated and phosphited compounds having exceptional usefulness as surface-active agents, wetting, washing, and disbursing agents, and as lubricating, anti-static and conditioning agents for textile yarns, particularly those composed of or containing cellulose acetate and related cellulose derivatives. Other objects will appear hereinafter.

These objects are accomplished by the following invention, which is based upon the unexpected discovery that if certain esters derived from unsaturated carboxylic acids containing the group

are heated and then blown with air or oxygen until an appreciable increase in specific gravity of the compounds occurs, such compounds will react with acids of phosphorus such as phosphorous, hypophosphorous, phosphoric, thiophosphoric, and the various pyro- and polyphosphorous and phosphoric acids. This is a most unusual phenomenon when it is taken into consideration that compounds containing the group

such as oleic acid, butyl oleate, oleyl alcohol, carbitol oleate, ethylene glycol dioleate, and butyl ricinoleate, do not add acids of phosphorus, such as phosphorous and phosphoric acids when mixed and heated therewith.

While we do not confine ourselves to any specific theory or explanation of the mechanism of the reaction involved when the unsaturated compounds are blown as above described, the reaction may be as follows:

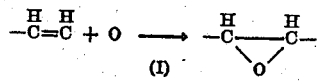

or

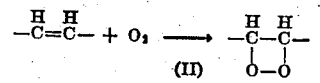

The reaction between the phosphorus acid and the structure resulting from the blowing operation may be represented conventionally as follows:

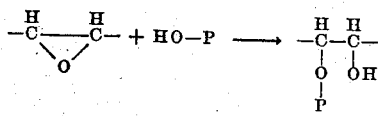

It will thus be seen that the phosphato or phosphito group adds to the carbon chain at the position originally occupied, before blowing, by an unsaturated linkage.

In general, the unsaturated compounds selected for blowing, such as Carbitol (β-ethoxyethyl) oleate, butyl oleate, oleyl butyrate, ricinoleyl crotonate, tetrahydrofurfuryl oleate, triethylene glycol diricinoleate, ethylene glycol diundecylenate, phenyl oleate, etc., are heated from 50° to 200° C. (125–180° C. preferred) and air or oxygen is passed in until a product having the desired properties is obtained. When the unsaturated compound is blown the iodine value falls, while the specific gravity, refractive index, acetyl value and saponification equivalent rise. One skilled in the art can, by following the progress of the above constants, determine when to stop blowing the unsaturated compound so as to obtain a product that will readily react with an acid of phosphorus.

Any of the -ous or -ic acids of phosphorus may be employed for phosphating or phosphiting the blown compounds in accordance with our invention. Typical examples of such acids are phosphoric acid, metaphosphoric acid, monosodium phosphate, pyrophosphoric acid, tetraphosphoric acid, phosphorous acid, hypophosphorous acid and pyrophosphorous acid.

In view of the foregoing explanation the compounds of our invention may then be regarded as esters of acids of phosphorus prepared by reacting an -ous or -ic acid of phosphorus with a blown unsaturated ester having the formula

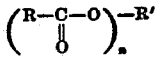

wherein R is an unsaturated hydrocarbon chain having 3–25 carbon atoms and R' is a hydrocarbon radical which may contain an ethylene group, such as phenyl allyl, cetyl, oleyl, etc., and wherein $n$ is 1 or 2.

In the following examples and description, we have set forth several of the preferred embodiments of our invention, but they are included merely for purposes of illustration and not as a limitation thereof.

Example 1

100 grams of Carbitol ($\beta$-ethoxyethyl) oleate is heated to 150° while stirring with a copper stirrer. Air is run into the reaction mixture through the stirrer. The following constants were obtained:

| Specific Gravity | Time of Blowing (hours) |
| --- | --- |
| 0.9245 | 4 |
| 0.9345 | 9 |
| 0.944 | 14 |
| 0.947 | 16 |
| 0.955 | 21 |
| 0.960 | 26 |

The blown Carbitol ($\beta$-ethoxyethyl) oleate is then heated on a steam bath for 10 hours with 60 grams of 85% phosphoric acid. The heavy viscous product is washed with water, and any desired organic or inorganic base salt is prepared. The acid product is soluble in water as are most of its salts. In place of phosphoric acid we may use phosphorous, hypophosphorous, pyrophosphorous, thiophosphoric, tetraphosphoric, triphosphoric acid, and the like.

Example 2

100 grams of triethylene glycol diricinoleate is blown at 150–160° C. with air until the specific gravity of the oil has increased about 0.065-unit. The product is then mixed with 30 grams phosphoric acid and warmed on a steam bath for 12 hours. The resulting heavy viscous product is washed with salt water or cold water to remove any unreacted phosphoric acid. The resulting product is soluble in water. Its salts may be prepared in the usual manner by reacting any suitable alkali or amino compound of alkaline reaction with the phosphated compound.

Example 3

100 grams of ethylene glycol diundecylenate is blown as above until the specific gravity has increased 0.04-unit and is then reacted as above with 40 grams pyro phosphoric acid and worked up as described in Example 2. The resulting heavy viscous product is water soluble.

In the above examples, phosphorous acid may of course be substituted for phosphoric. The -ous acid esters have the same general solubility properties as the -ic acid esters.

Many of the esters used have been described in the prior art. The preparation of others does not present any special problems, that is, they are prepared by reacting the desired acid with the desired carbinol using a catalyst such as sulfuric acid.

Example 4

Butyl oleate is blown as in Example 1 and reacted with pyrophosphorous acid as above. Among the valuable salts of this material are the sodium, potassium, mono-, di, and tri-ethanolamine, diethylcyclohexylamine, mono-, di, and tri-furfurylamine, and the corresponding tetrahydro compounds, cyclohexylamine, cetylamine and the like.

Example 5

Oleyl butyrate is blown as in Example 1 until the specific gravity has increased about 0.05 unit and is reacted with 85% phosphoric acid as above. The product is water-soluble. Any desired salt may be prepared.

Example 6

Ricinoleyl crotonate is blown and reacted with thiophosphoric acid as previously described. From the water-soluble product any desired salt may be prepared.

Example 7

Tetrahydrofurfuryl oleate is blown as in Example 1 and is reacted as above with triphosphoric acid. The resulting water-soluble product and its salts have valuable anti-static and surface-active properties.

While we have found it convenient to illustrate our invention by reference to procedures involving the blowing of certain specific unsaturated esters, it will be evident that many modifications in such procedures may be made within the scope of our invention. In general, it may be said that, irrespective of the particular ester dealt with, the blowing operation may be carried out in a manner analogous to that which is customarily employed in the blowing of various oils, fats, and waxes.

The blown and phosphated or phosphited compounds of our invention have many valuable applications in industry. For example, they may be employed as surface-active agents, wetting, washing and dispersing agents. We have also found them to have outstanding properties when employed as lubricating anti-static and conditioning agents for textile yarns, particularly those composed of or containing cellulose acetate and related cellulose derivatives.

The preparation of novel esters of an acid of phosphorous is disclosed and claimed in our copending applications Serial Nos. 602,415, now abandoned, and 602,416, both filed June 29, 1945.

What we claim is:

1. The process of producing an ester of an inorganic acid of phosphorous which comprises blowing an unsaturated ester having the formula:

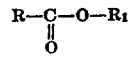

wherein R represents the unsaturated hydrocarbon radical of oleic acid and $R_1$ represents a radical selected from the group consisting of $\beta$-ethoxyethyl and butyl, at from 50° to 200° C., until an appreciable increase in specific gravity occurs, and thereafter treating the blown ester with an acid of phosphorus selected from the group consisting of phosphoric acid and phosphorous acid.

2. The process of producing an ester of an inorganic acid of phosphorus which comprises blowing β-ethoxyethyl oleate, at from 50° to 200° C., until an appreciable increase in specific gravity occurs, and thereafter treating the blown β-ethoxyethyl oleate with an acid of phosphorus selected from the group consisting of phosphoric acid and phosphorous acid.

3. The process of producing an ester of an inorganic acid of phosphorus which comprises blowing butyl oleate, at from 50° to 200° C., until an appreciable increase in specific gravity occurs, and thereafter treating the blown butyl oleate with an acid of phosphoric acid and phosphorous acid.

JOSEPH B. DICKEY.
JAMES G. McNALLY.

REFERENCES CITED

The following references are of record in the file of this patent:

UNITED STATES PATENTS

| Number | Name | Date |
|---|---|---|
| 2,125,544 | Colbeth | Aug. 2, 1938 |
| 2,185,967 | Priester | Jan. 2, 1940 |
| 2,187,334 | Stickdorn | Jan. 16, 1940 |
| 2,260,819 | Balassa | Oct. 28, 1941 |
| 2,278,426 | Colbeth | Apr. 7, 1942 |
| 2,345,734 | Dickey et al. | Apr. 4, 1944 |